(12) United States Patent
Lobato

(10) Patent No.: US 11,607,626 B2
(45) Date of Patent: Mar. 21, 2023

(54) ADAPTER FOR ELECTRO-COALESCER INSULATED ELECTRODES WITH METAL SEALING FOR ELECTRODES

(71) Applicant: FMC Technologies, Inc., Houston, TX (US)

(72) Inventor: Arturo Ernesto Menchaca Lobato, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 94 days.

(21) Appl. No.: 17/420,951

(22) PCT Filed: Jan. 3, 2020

(86) PCT No.: PCT/US2020/012186
§ 371 (c)(1),
(2) Date: Jul. 6, 2021

(87) PCT Pub. No.: WO2020/142691
PCT Pub. Date: Jul. 9, 2020

(65) Prior Publication Data
US 2022/0072450 A1 Mar. 10, 2022

Related U.S. Application Data

(60) Provisional application No. 62/788,619, filed on Jan. 4, 2019.

(51) Int. Cl.
*B01D 17/06* (2006.01)
*B03C 11/00* (2006.01)

(52) U.S. Cl.
CPC .............. *B01D 17/06* (2013.01); *B03C 11/00* (2013.01); *B03C 2201/02* (2013.01)

(58) Field of Classification Search
CPC ................................ B01D 17/06; B03C 11/00
See application file for complete search history.

(56) References Cited

U.S. PATENT DOCUMENTS

| 3,352,963 A | 11/1967 | Homrig |
| 3,701,723 A | 10/1972 | Cole et al. |

(Continued)

FOREIGN PATENT DOCUMENTS

| GB | 2455836 A | 6/2009 |
| WO | 2008007185 A1 | 1/2008 |
| WO | 2018153491 A1 | 8/2018 |

OTHER PUBLICATIONS

International Search Report issued in International Application No. PCT/US2020/012186 dated May 29, 2020 (4 pages).

(Continued)

*Primary Examiner* — Brian W Cohen
(74) *Attorney, Agent, or Firm* — Osha Bergman Watanabe & Burton LLP

(57) ABSTRACT

Electro-coalescer systems herein may include a vessel, a base plate separating a process chamber and an electric enclosure, rod-shaped ceramic insulated electrodes, and a sealing assembly. An end of the electrodes is located within the electric enclosure. The electrodes traverse respective through-holes of the base plate into or through the process chamber, where a second portion is supported by a spacer, configured to maintain a position of the electrodes while allowing fluid passage. The sealing assembly forms a seal between the through-holes and the rod-shaped insulated electrodes, preventing fluid traversing from the process chamber into the electric enclosure. The sealing assembly may include: a metal fitting disposed around the rod-shaped insulated electrode; metal o-rings; metal seats; and a closing nut. The metal fitting has a coefficient of thermal expansion (Continued)

similar to that of the ceramic insulator, thereby preventing breakage of the electrodes during use.

14 Claims, 6 Drawing Sheets

(56) References Cited

U.S. PATENT DOCUMENTS

| | | | | |
|---|---|---|---|---|
| 3,769,188 A | * | 10/1973 | McMahon | B03C 5/00 |
| | | | | 204/671 |
| 3,926,774 A | | 12/1975 | Watson et al. | |
| 5,591,317 A | | 1/1997 | Pitts, Jr. | |
| 8,414,777 B2 | * | 4/2013 | Bjorklund | B03C 3/06 |
| | | | | 210/708 |

OTHER PUBLICATIONS

Written Opinion issued in International Application No. PCT/US2020/012186 dated May 29, 2020 (6 pages).

\* cited by examiner

ADAPTER FOR ELECTRO-COALESCER INSULATED ELECTRODES WITH METAL SEALING FOR ELECTRODES

BACKGROUND OF DISCLOSURE

Field of the Disclosure

Embodiments disclosed herein relate generally to electro-coalescers. More specifically, embodiments herein relate to attachment of rod-shaped insulated electrodes within an electro-coalescer vessel.

Background

From the electrical, chemical and thermal point of view, ceramics, such as alumina, are the most suitable insulating materials for electrodes used in electrostatic-coalescers. Likewise, from the mechanical and process performance point of view, long rods or tubes are the most suitable geometries for insulated electrodes used in electro-coalescers.

As described in WO2018/153491, for example, a long ceramic tube electrostatic-coalescer electrode design may accommodate a long electrical conductor in its interior. The internal conductor may be connected to a power source, and the ceramic tube provides the required electrical insulation and process sealing. However, such construction poses major technical challenges.

As one example of a technical challenge, the coefficient of thermal expansion of most metals, including suitable conductive metals, like copper, is vastly different from that of ceramics, like alumina. Therefore, the temperature difference to which the electrodes are subjected during their service life can easily cause the electrodes to fail structurally, which can result in process fluid leakage, and electrical short-circuit, forcing the operation to stop.

As another example of a technical challenge, the high stiffness of brittle ceramics like alumina require the electrode construction and interface s to be either flexible or be manufactured and assembled with the highest level of precision. In a rigid construction, any small misalignment between the electrode and its interfaces with the equipment can result in structural failure of the electrodes, such as misalignments arising during assembly, transportation, installation, or during service as a result of vibrations and/or thermal and/or pressure cycling.

Further technical difficulties arise due to material discontinuities in the ceramic tubes, such as voids and bubbles. These voids and bubbles can considerably increase power losses and result in maloperation and/or premature failure of the equipment. Moreover, power losses may result in the process fluid being heated beyond desirable limits, potentially causing destabilization of the process fluid as more gas may come out of solution.

Air pockets or gaps subject to the electric field inside of the electrode can also considerably increase power losses and result in maloperation and/or premature failure of the equipment. In practice, such air pockets and gaps can appear between the conductor inside of the electrode assembly and the inner wall of the ceramic tube. Such gaps may even be left there on purpose, in order to leave clearance between materials with difference in coefficient of thermal expansion, thereby preventing structural failure of the electrode due to thermal variations during the lifespan of the unit.

Metallic parts in contact or in the vicinity of the ceramic tube present further challenges, as these may locally but drastically intensify the electrical stress over the ceramic insulation. This is particularly true where the geometry of the metal parts is rough or contains sharp edges that intensify the electric field over the ceramic material.

SUMMARY OF THE DISCLOSURE

Embodiments herein are directed toward electro-coalescers using long rod-shaped ceramic-insulated electrodes, where the configuration of the coalescer and electrode, more specifically the attachment between the process vessel and the insulated electrode, are designed to address the above-noted challenges. Moreover, the construction described herein is very simple, robust and cost-effective for constructions intended for commercial applications.

In one aspect, embodiments disclosed herein relate to an electro-coalescer system. The electro-coalescer system may include: a vessel, a base plate, one or more pipes, one or more rod-shaped insulated electrodes, and a sealing assembly. The vessel may include a vessel having a fluid inlet and a fluid outlet, between which is defined a process chamber. The base plate separates an electric enclosure from the process chamber. The one or more pipes fluidly connect the fluid inlet and the fluid outlet, and the one or more rod-shaped insulated electrodes each include a conductor disposed within a ceramic insulator.

A first end of the one or more rod-shaped insulated electrodes may be located within the electric enclosure. The one or more rod-shaped electrodes may traverse respective through-holes of the base plate and extend through at least a portion of the one or more pipes. A second portion of the one or more rod-shaped electrodes is supported by a spacer, the spacer being configured to support and maintain a position of the one or more insulated electrodes while simultaneously allowing fluid passage.

The sealing assembly may be configured to form a seal between the through-holes and the rod-shaped insulated electrodes, preventing fluid from traversing from the process chamber into the electric enclosure. The sealing assembly may include: a metal fitting disposed around the rod-shaped insulated electrode; one or more metal o-rings; metal seats; and a closing nut. The metal fitting may have a coefficient of thermal expansion similar to the coefficient of thermal expansion of the ceramic insulator, thereby preventing breakage of the rod-shaped insulated electrodes during use, as may result from expansion of the components at operating conditions.

In some embodiments, the metal fitting may have a coefficient of thermal expansion within 1% of the coefficient of thermal expansion of the ceramic insulator. In other embodiments, the metal fitting may have a coefficient of thermal expansion the same as the coefficient of thermal expansion of the ceramic insulator.

The interface between the metal seat and the base plate may contain features to prevent the rotation of the electrode assembly and/or the metal o-rings while tightening the closing nut.

The rod-shaped insulated electrode may include a monolithic ceramic tube that is void- and bubble-free. An inner wall of the monolithic ceramic tube may be plated with a conductive metal, in some embodiments. And, an outside wall of a conductive tubular sleeve may be in electric contact with the conductive metal plating.

The rod-shaped insulated electrode, as noted above, may be a monolithic ceramic tube. The monolithic ceramic tube may have an open end and a closed end, and the closed end may extend a distance from an end of the tube. In some embodiments, the spacer may be located along the distance of the closed end.

In some embodiments, the ceramic insulated electrode rods may be formed from alumina. The metal fitting may be formed from titanium. The spacer may be metallic. The metal o-rings, the metal seats, and the base plate may be made of a material different than that of the metal fitting in some embodiments.

Each through-hole of the base plate may include a threaded portion extending from the electrical enclosure side and terminating proximate a first shoulder intermediate the electrical enclosure side and the process chamber side of the base plate. Each through-hole may also include a first longitudinal portion extending from the first shoulder to a second shoulder, as well as a second longitudinal portion extending from the second shoulder to the process chamber side of the base plate. A first metal seat of the sealing assembly may be disposed proximate the first shoulder, a second metal seat of the sealing assembly may be disposed proximate the second shoulder, and the first and second metal seats may each include a concave portion configured to mate with a convex portion of the metal fitting.

In some embodiments, the first metal seat may include a shoulder configured to interact with the first shoulder of the through-hole such that longitudinal movement of the first metal seat along the first longitudinal portion is limited. The metal o-rings may form a seal between a metal fitting, one of the metal seats, and the through-hole.

In some embodiments, the base plate through-holes may be disposed at an angle from perpendicular, relative to a face of the base plate. A support hole of the spacer may also be disposed at a similar angle from perpendicular. In such embodiments, the electrode rods may likewise be installed such that they are disposed at an angle through the process chamber.

In other aspects, embodiments disclosed herein are directed toward sealing assemblies for use with rod-shaped electrodes, and processes for separating fluids, such as emulsions, using an electro-separator according to embodiments described herein.

Other aspects and advantages will be apparent from the following description and the appended claims.

DETAILED DESCRIPTION

Figure 1:
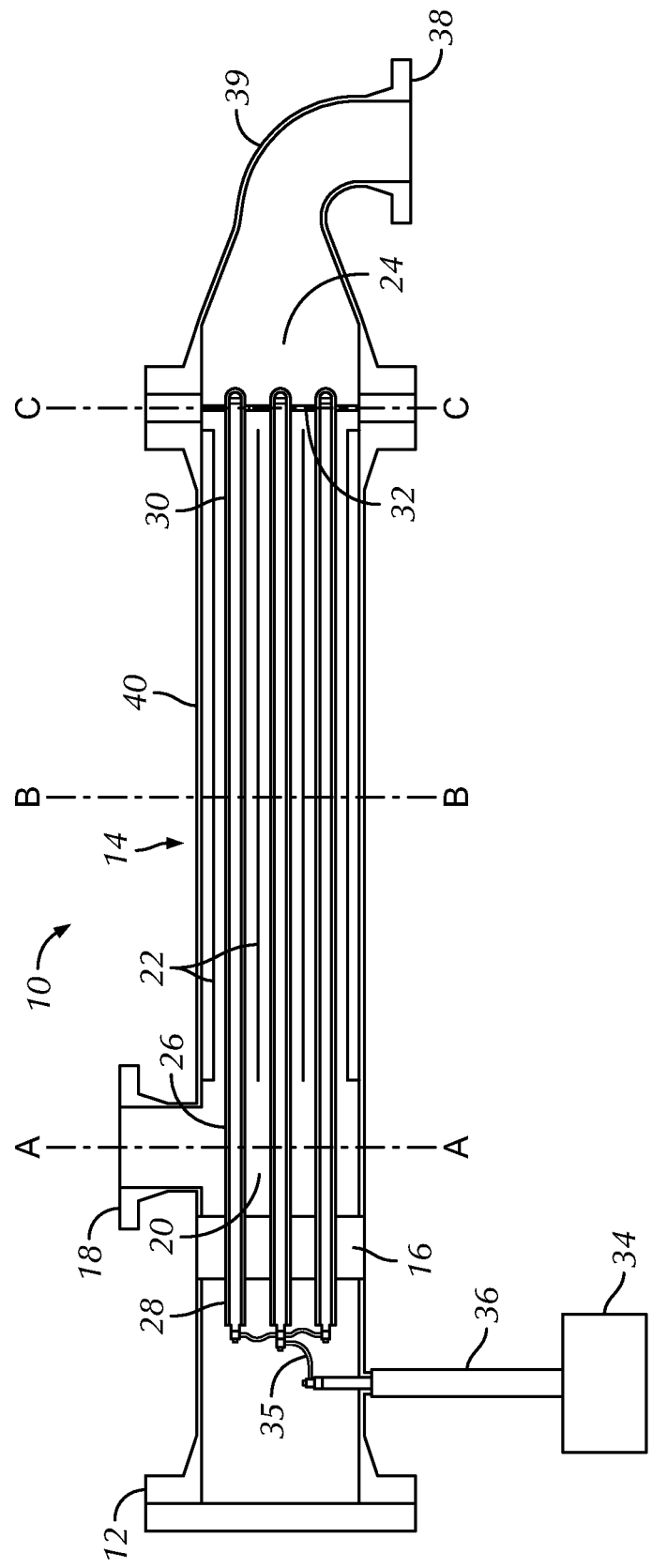
FIG. 1 is a simplified diagram of a coalescer system according to embodiments herein.

Embodiments disclosed herein relate generally to electro-coalescers. More specifically, embodiments herein relate to electro-coalescers having rod-shaped insulated electrodes and to the attachment of the rod-shaped insulated electrodes within an electro-coalescer vessel.

Electro-coalescers according to embodiments herein may be used to separate a process fluid, such as a fluid comprising a dominant phase and a tight emulsion of at least a second, undesirable phase termed the dispersed phase. There may be multiple dispersed phases. Treatment of the process fluid may be performed in an electro-coalescer according to embodiments herein. After treatment, the fluid may have the same overall composition, but the droplets of the dispersed phase(s) have coalesced into larger droplets. These larger droplets are much easier to separate via conventional means, such as gravity or centrifugal separation, as the larger coalesced droplets may settle or separate faster due to increased mass.

The electro-coalescer may be applied to any fluid system where the specific resistance of the dominant phase is larger than about $10^7$ Ohm*m and where the electric permeability of the dominant phase and the dispersed phase(s) are different. For example, the size of water droplets in hydrocarbon liquid or gas streams may be enlarged by the electro-coalescer to more efficiently remove water from the liquid or to dry the gas.

Electro-coalescer systems according to embodiments herein may be a stand-alone unit operation, receiving a feed from upstream and discharging a coalesced product stream for further processing downstream, such as in a gravity settler. In other embodiments, electro-coalescer systems according to embodiments herein may be integral with a gravity settler, such as described in WO2018153491 (FMC Separation Systems By).

The electro-coalescer may include a vessel or outer shell having a fluid inlet, for receiving a fluid to be treated including a dispersed phase of a given droplet size, and a fluid outlet, for discharging a treated fluid that has an increased droplet size. Between the fluid inlet and outlet is a process chamber having one or more pipes fluidly connecting the fluid inlet and the fluid outlet. The pipes may traverse, for example, from an inlet head of the vessel to an outlet head of the vessel, the pipes being arranged and supported by a tube sheet or other structures. The inlet and process chamber are configured to direct flow from the inlet, through the pipes, and to the outlet.

The electro-coalescer may also include a base plate separating an electric enclosure from the process chamber. One or more rod-shaped insulated electrodes, including a conductor disposed within a ceramic insulator, are disposed in the vessel/process chamber, and may extend from inside the electric enclosure, through the base plate, and into or through the pipes. In this manner, the fluid to be treated may flow through the pipes in an annular region surrounding the electrode, in contact with an electric field generated by the electrodes, to result in coalescence of the dispersed phase.

In some embodiments, a first end of the one or more rod-shaped insulated electrodes is located within the electric enclosure. The electric enclosure may be, for example, proximate the inlet end or the outlet end of the process chamber. The one or more rod-shaped electrodes traverse respective through-holes of the base plate and through at least a portion of the one or more pipes. In some embodiments, the one or more rod-shaped electrodes traverse respective through-holes of the base plate and through the one or more pipes, extending into the outlet chamber, for example.

The rod-shaped insulated electrodes may be held in place or supported by a sealing assembly in each of the respective through-holes. A second portion of the one or more rod-shaped electrodes may be supported by a spacer. The spacer or spacers, for example, may be disposed within the process tubes, supporting an end of the electrode. In other embodiments, the spacer(s) may be disposed in the inlet or outlet end of the process chamber, supporting an end of one or more electrode.

The spacer(s) may be configured to support and maintain a position of the one or more insulated electrodes while simultaneously allowing fluid passage. For example, the spacers may include a support structure including a through-hole for receiving an end of the electrode and one or more fluid passages. The spacers are described in more detail below, and may be metallic or a ceramic.

The sealing assembly may be configured to form a seal between the through-holes and the rod-shaped insulated electrodes, preventing fluid from traversing from the process chamber into the electric enclosure. The sealing assembly, described further below, may include a metal fitting disposed around the rod-shaped insulated electrode, one or more metal o-rings, metal seats, and a closing nut, for example.

The metal fitting surrounds the insulated electrode, and is configured to form a metal-to-ceramic insulator seal. The metal fitting may have a coefficient of thermal expansion similar to the coefficient of thermal expansion of the ceramic insulator. The present inventors have found that by including a metal fitting having a coefficient of thermal expansion similar to that of the ceramic insulator, the system integrity may be maintained, with essentially no breakage of the electrodes as a result of thermal expansion of the system proximate the base plate. Similar coefficients of thermal expansion are defined herein as within 3% of each other (|electrode−metal fitting|/electrode). In some embodiments, the metal fitting may have a coefficient of thermal expansion within 2% or within 1% or within 0.5% of the coefficient of thermal expansion of the ceramic insulator. In other embodiments, the metal fitting may have a coefficient of thermal expansion the same as the coefficient of thermal expansion of the ceramic insulator.

In some embodiments, the ceramic insulator is alumina and the metal fitting is formed from titanium. Other ceramic-metal pairings may also be used. It is additionally noted that various grades of alumina may have different coefficients of thermal expansion; titanium or mixtures/alloys of titanium and other metals may also have coefficients of thermal expansion that encompass a range of values. As noted above, the coefficients of thermal expansion of the materials used should be similar, so as to provide the benefits described herein.

The metal o-rings, the metal seats, and the base plate may be made of a material the same as or different than that of the metal fittings. As noted above, it has been found that the properties of the metal fittings are a controlling factor. While it would be desirable to have an overall system having similar coefficients of thermal expansion, cost and other design factors may favor the matching of the coefficient of thermal expansion of only the metal fitting to that of the ceramic insulator used in the electrode.

For installation of the rods and to form the seal using the sealing assembly, each through-hole of the base plate may include a threaded portion extending from the electrical enclosure side and terminating proximate a first shoulder intermediate the electrical enclosure side and the process chamber side of the base plate. The through-holes may also include a first longitudinal portion extending from the first shoulder to a second shoulder, and a second longitudinal portion extending from the second shoulder to the process chamber side of the base plate. A first metal seat may be disposed proximate the first shoulder, and a second metal seat may be disposed proximate the second shoulder. Installation order of the sealing assembly, from the electric enclosure side to the process chamber side, may thus be: closing nut, first metal seat, first metal o-ring, metal fitting, second metal o-ring, and then second metal seat.

During installation, the closing nut may push the sealing assembly into the through hole such that the second metal seat abuts the second shoulder. The second metal o-ring may thus form a seal between the first longitudinal portion, the second metal seat, and the metal fitting. Rotation of the closing nut may also result in the first metal seat moving closer to the second metal seat, forcing the metal fitting into sealing engagement with the ceramic insulator rod, and where the first o-ring may form a seal between the first longitudinal portion, the first metal seat, and the metal fitting. The first and second metal seats each include a concave portion configured to mate with a convex portion of the metal fitting, providing for a metal-to-metal seal as well as to facilitate movement of the component parts when the closing nut is engaged.

To prevent over-tightening of the sealing assembly, the first metal seat may include a shoulder configured to interact or engage with the first shoulder of the through-hole, such that longitudinal movement of the first metal seat along the first longitudinal portion is limited. In this manner, the desired sealing of the ceramic insulator rods within the through-holes may be effectively formed while avoiding breakage of the ceramics.

In some embodiments, the sealing assembly may include an interface between the metal seat and the base plate that contains features to prevent the rotation of the electrode assembly and/or the metal o-rings while tightening the closing nut. Rotation of the components may put undesired stress on the ceramic insulator rod, and thus rotation preventing features may provide another means to limit or eliminate undesired breakage of the electrodes during assembly of the coalescer system.

The rod-shaped ceramic insulated electrode may be formed as a monolithic ceramic tube. Preferably, the monolithic structure is void- and bubble-free. An inner wall of the monolithic ceramic tube may be plated with a thin layer of a conductive metal, such as copper. The conductive metal layer may be thin enough to prevent mechanical damage of the ceramic tube, the plate itself, or detachment of the two components during service due to thermal variations. The conductive metal layer may also be thick enough to keep the electrical resistance along the electrode sufficiently low.

An outside wall of a conductive tubular sleeve may be in electric contact with the conductive metal plating. For example, an inner copper layer of the ceramic tube may be in electrical contact with a conductive wire-braided tubular sleeve. In some embodiments, the conductive tubular sleeve may be in electric contact with the metal layer plated on the monolithic ceramic tube along the entire length of the inner surface of the ceramic tube.

The rod-shaped ceramic insulated electrode, as noted above, may be a monolithic ceramic tube. The tube may have an open end, a tubular section, and a closed end. The open end may allow for installation of the conductive tubular sleeve within the ceramic tube, as well as for electrical connection of the conductive sleeve to a power supply. The closed end of the tube may extend a distance from an end of the tubular section. For example, the tubular portion of the ceramic rod may terminate, but a solid end of the ceramic structure may continue for a short distance. The thick ceramic end may thus provide for structural integrity of the ceramic rod, such as may be needed during installation, as well as for structural support of the rod within the spacer element holding or supporting the end of the electrode within the coalescer system. Thus, in some embodiments, the spacer may be located along the distance of the closed end (i.e., between the terminus of the inner tube and the end of the ceramic rod).

Referring now to FIG. 1, an electro-coalescer system according to embodiments herein is illustrated. The electro-coalescer 10 may include an electric enclosure 12 and a process chamber 14. The electric enclosure 12 and the process chamber 14 may be separated by a base plate 16.

A fluid inlet 18 may provide a flow of fluid into the inlet section 20, and the flow may be directed through one or more process tubes 22 to an outlet end or outlet section 24. As illustrated, in some embodiments, the electro-coalescer may include long rod-shaped ceramic electrodes 26 extending from the electric enclosure 12, through the base plate 16, and through the process tubes 22.

A first end 28 of the electrodes 26 may be supported by the base plate 16, and a second end 30 of the electrodes may be supported by a spacer 32. The electrodes may be electrically connected to a power source 34 via electric cable and/or wiring 35, which may be disposed, at least partially, within a conduit 36. Additionally, the pipes or process tubes 22 may be connected to a ground 38, such as via wiring or other electrical connections 39 between the process chamber shell 40 and ground 38.

The first end 28 of the electrodes 26 is disposed through and supported by the base plate 16. As discussed above, it is desirable to prevent fluid flow into the electric enclosure, and thus a seal must be formed between the base plate 16 and the electrodes 26.

Figure 2:
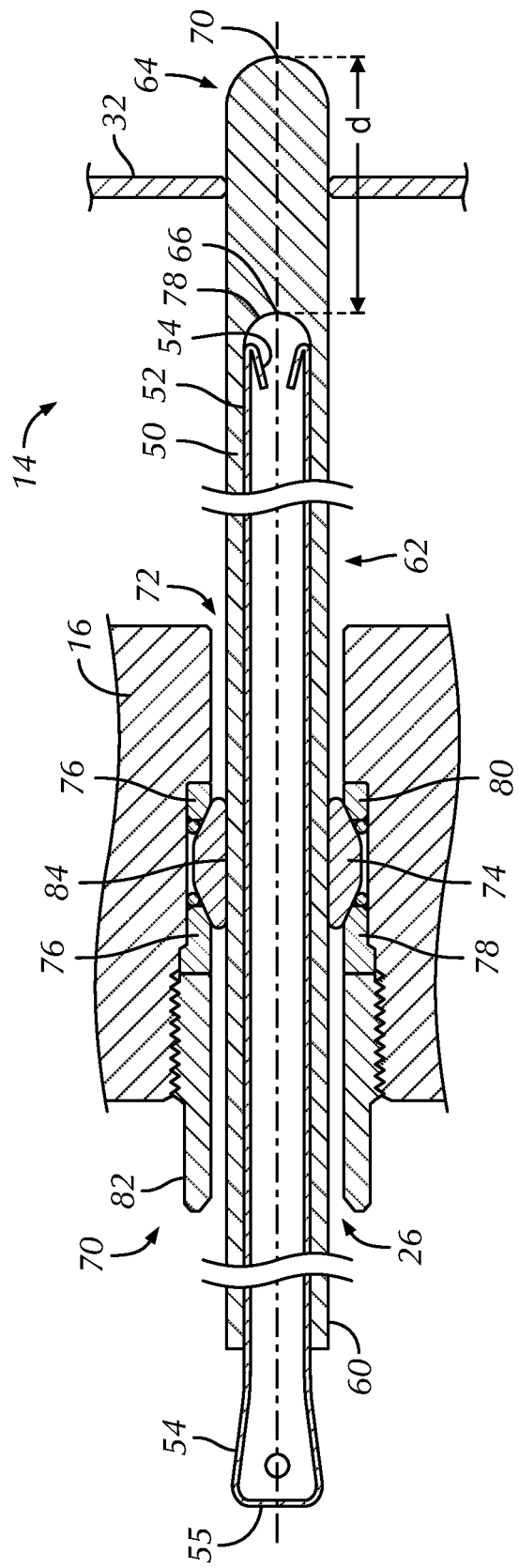
FIG. 2 and FIG. 3 illustrate a cross-sectional view of a sealing system useful with coalescer systems according to embodiments herein.
Figure 3:
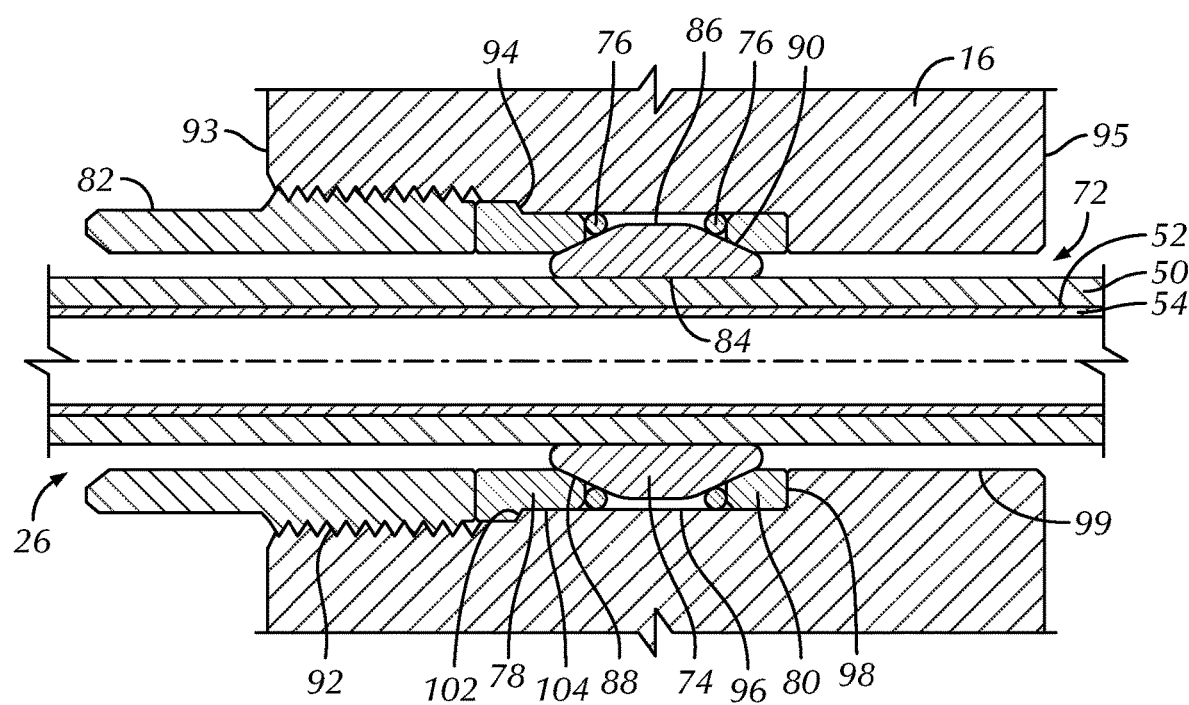

Referring now to FIGS. 2 and 3, configurations of the electrode, support systems, and the seal assembly are illustrated. The rod-shaped ceramic insulated electrodes 26, as noted above, may include a monolithic ceramic tube 50. An inner wall of the ceramic tube may be coated with a conductive metal layer 52, such as copper. Disposed within the metal coated ceramic tube may be a conductive tubular sleeve 54. An outside wall of the conductive tubular sleeve 54 may be in electric contact with the conductive metal plating layer 52. For example, an inner copper layer 52 of the ceramic tube 50 may be in electrical contact with a conductive wire-braided tubular sleeve 54. In some embodiments, the conductive tubular sleeve 54 may be in electric contact with the metal layer 52 plated on the monolithic ceramic tube along the entire length of the inner surface of the ceramic tube 50.

The ceramic tube 50 of the electrode 26 may have an open end 60, a tubular section 62, and a closed end 64. The open end 60 may allow for installation of the conductive tubular sleeve 54 within the ceramic tube 50, as well as for electrical connection of the conductive sleeve 54 to a power supply 34 (FIG. 1), such as at end 55 of conductive sleeve 54.

The closed end 64 of the tube may extend a distance "d" from an end 66 of the tubular section 62. For example, the tubular portion 62 of the ceramic rod may terminate, but a solid end of the ceramic structure 50 may continue for a short distance d. The solid end of the ceramic structure may thus provide for the structural integrity and support of the ceramic rod, as discussed above. The end section 66 of the ceramic tube 60 may be disposed within spacer element 32, holding or supporting the end 66 of the electrode within the coalescer system. To provide the desired support and structural integrity, the spacer may be located along the distance d of the end section 64 (i.e., between the terminus 66 of the inner tube and the end 70 of the ceramic rod). Restated, in some embodiments, the ceramic rod has an overall length such that the open end 60 is disposed in the electric enclosure 12, while the solid end section 64 rests in the support structure 32.

A sealing assembly 70 may be provided to form a seal between through-holes 72 in the base plate 16 and the rod-shaped insulated electrodes 26. The seals desirably prevent fluid traversing from the process chamber 14 into the electric enclosure 12, as discussed above. The sealing assembly, as illustrated in the embodiments of FIGS. 2 and 3, may include a metal fitting 74 disposed around the rod-shaped insulated electrode 26, one or more metal o-rings 76, a first metal seat 78, a second metal seat 80, and a closing nut 82.

The metal fitting 74 may be formed from one or more component parts, and may include a cylindrical inner surface 84. For example, the metal fitting 74 may be formed as a single ring having an inner diameter of similar dimensions to that of the outer diameter of the ceramic rod. In other embodiments, the metal fitting may be formed as a ring containing two, three or four independent sections, where compression of the sections forms a contiguous metal-to-ceramic seal between the metal fitting 74 and the ceramic rod 50.

Figure 3A:
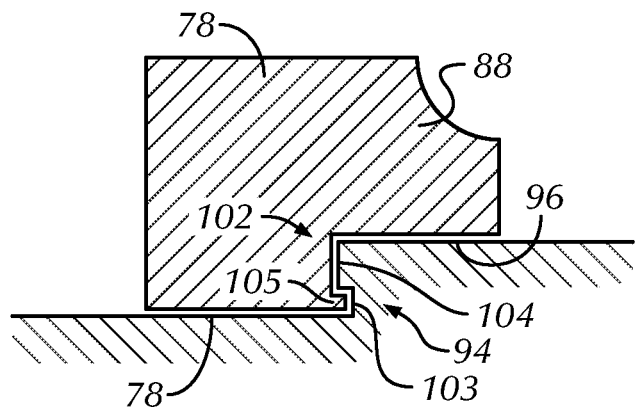
FIGS. 3A, 3B, and 3C illustrate cross-sectional views of sealing elements useful with coalescer systems according to embodiments herein.
Figure 3B:
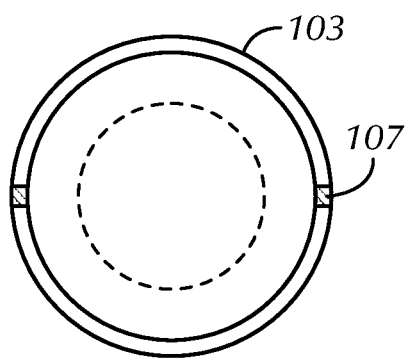
Figure 3C:
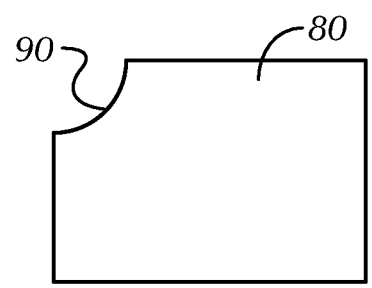

An outer surface 86 of the metal fitting 74 may be spherical in shape. In some embodiments, the outer surface 86 of the metal fitting is spherical in shape proximate each longitudinal end of the fitting. The spherical shape of the convex outer surface 86 may mate with a spherical concave inner surface 88, 90 of each of the first and second metal seats 78, 80, respectively, as depicted in FIG. 3C.

Each through-hole 72 of the base plate 16 may include a threaded portion 92. The threaded portion 92 may extend a distance from the electrical enclosure side 93 of the base plate 16, terminating proximate a first shoulder 94. The threaded distance should be sufficient long so as to allow the closing nut 82 to apply and hold a force on the first metal seat 78. Shoulder 94 may be located intermediate the electrical enclosure side 93 and the process chamber side 95 of the base plate 16. The through-holes 72 may also include a first longitudinal portion 96 extending from the first shoulder 94 to a second shoulder 98. The through-holes 72 may further include a second longitudinal portion 99 extending from the second shoulder 98 to the process chamber side 95 of the base plate 16. Installation order of the sealing assembly, from the electric enclosure side 93 to the process chamber side 95 of the base plate 16, may thus be: closing nut 82, first metal seat 78, a first metal o-ring 76, metal fitting 74, a second metal o-ring 76, and then second metal seat 80.

The closing nut 82, as noted above, when threaded into the through-hole 72, may apply a force to the sealing assembly. Second metal seat 80 will thus abut second shoulder 98, preventing further movement of the sealing assembly through the through hole. At this point, continued rotation of the closing nut 82 will move the first and second metal seats 78, 80 closer to one another, forcing the metal fitting 74 into sealing engagement with ceramic rod 50. The spherical surfaces 86, 88, 90 provide for ease of movement between the component parts, allowing the first metal seat 78 to move further into the through-hole and resulting in sealing engagement of each component part of the sealing assembly. The metal fitting forms a seal against the ceramic rod, while the second metal o-ring forms a seal between the first longitudinal portion, the second metal seat, and the metal fitting, and the first o-ring may form a seal between the first longitudinal portion, the first metal seat, and the metal fitting.

A shoulder 102 may be provided on an outer surface of first metal seat 78. Shoulder 102 may be configured to engage with the first shoulder 94 of the through-hole, such that longitudinal movement of the first metal seat 78 along the first longitudinal portion 96 is limited. The sizing of the component parts may thus be designed to provide the desired sealing of the ceramic insulator rods within the through-holes 72 while effectively avoiding over-tightening of the seal assembly.

The sealing assembly may include an interface between the metal seat and the base plate that contains features to prevent the rotation of the electrode assembly and/or the metal o-rings while tightening the closing nut, such as a tongue-and-groove type relationship between the sealing elements. For example, a notch or circumferential groove 103 (FIGS. 3A and 3B) in or along radial surface 104 of shoulder 94 may receive tongue or extension 105 (FIG. 3A) of first metal seat 78 located on an axial surface of shoulder 102. Tongue or extension 105 may only partially encompass the circumference of the first metal seat shoulder 102. One or more stops 107 may be located in circumferential groove 103. In this manner, the extension may engage the notch, preventing rotation of the first metal seat 78 during rotation of the closing nut 82. Other features to prevent rotation of the electrode assembly and/or the seal assembly components may also be used.

Figure 4A:
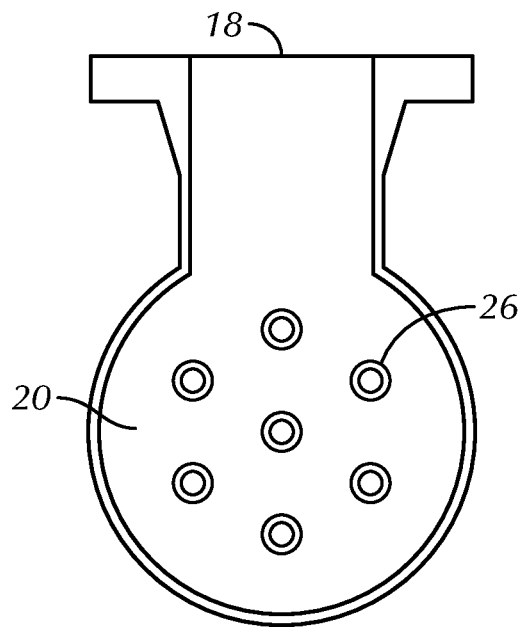
FIGS. 4A, 4B, and 4C are cross-sectional views of a coalescer system according to embodiments herein.
Figure 4B:
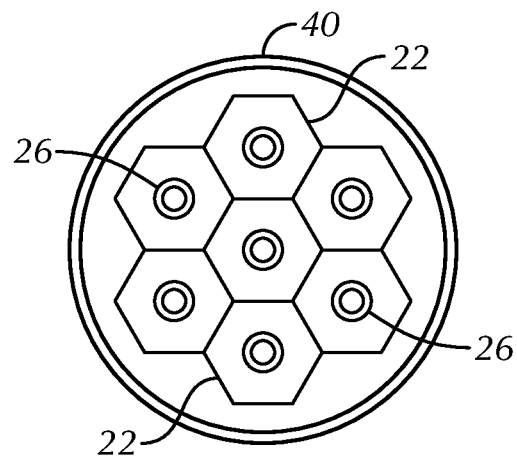
Figure 4C:
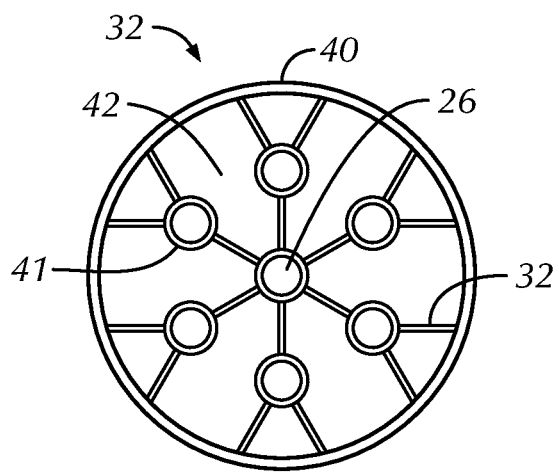

Referring now to FIG. 4A-4C, cross-sections of the electro-coalescer are illustrated, were FIG. 4A illustrates cross-section A-A as shown in FIG. 1, FIG. 4B illustrates cross-section B-B as shown in FIG. 1, and FIG. 4C illustrates cross-section C-C as shown in FIG. 1. As illustrated in FIG. 4A, inlet 18 may provide for a fluid flow into inlet section 20, flowing around the electrodes 26 traversing inlet section 20 (from the base plate 16 to the process chamber 14, as illustrated in FIG. 1). As illustrated in FIG. 4B, the process chamber 14 may have an outer shell 40 through which are disposed multiple process tubes 22, through each of which is disposed an electrode 26. Each of the electrodes may traverse through a process tube 22 into outlet section 24, where an end 28 of the electrodes may be supported by a spacer 32, as illustrated in FIG. 4C. The electrodes 26 may be disposed in support holes 41, while liquid flow may be permitted through voids 42 formed in the structure of spacer 32.

Figure 5:
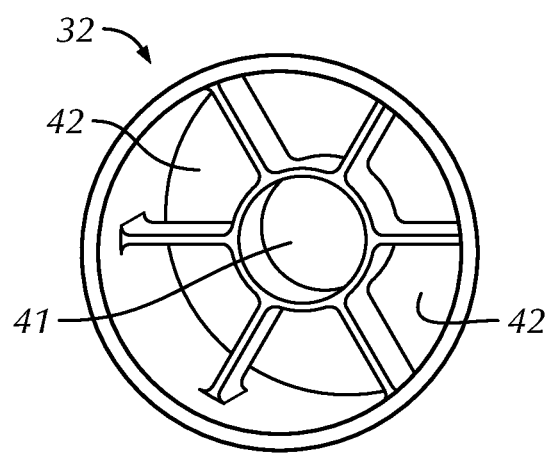
FIG. 5 is a peripheral view of a spacer useful with coalescer systems according to embodiments herein.

FIG. 4C illustrates an embodiment where the electrodes extend fully through the process tubes 22. In some embodiments, such as where there is only one process tube, or where the electrode terminates within a process tube, a spacer 32 such as illustrated in FIG. 5 may be used, where the electrode 26 is disposed within support hole 41 and liquid flow is permitted through voids 42.

Electro-coalescer systems according to embodiments herein may be a stand-alone unit operation, such as illustrated in FIG. 1. In such a system, the electro-coalescer may receive a feed from upstream through inlet 18. The fluid may then be treated (coalesced) during passage through process tubes 22. A coalesced product may then be recovered in outlet end 24 and discharged via outlet 38 for further processing downstream, such as in a gravity settler (not illustrated).

Figure 6:
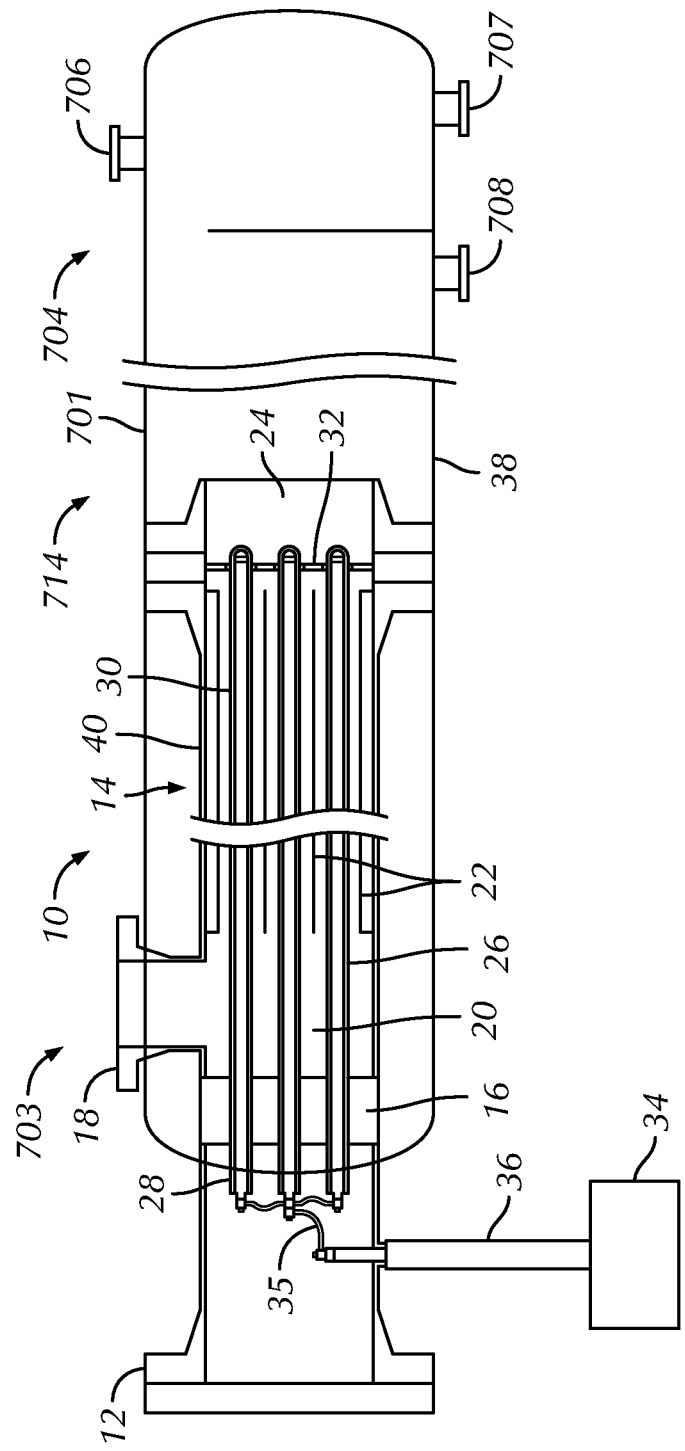
FIG. 6 is a simplified diagram of a coalescer system according to embodiments herein.

In other embodiments, electro-coalescer systems according to embodiments herein may be integral with a gravity settler, such as illustrated in FIG. 6. A separator according to embodiments as shown in FIG. 6 may include main components such as a horizontal cylindrical vessel 701 and an electro-coalescer system 10 arranged within or partially within the vessel. The cylindrical vessel 701 features an inlet section 703, providing flow of a liquid into the electro-coalescer system 10. The cylindrical vessel 701 may also include a main settling section 714, where settling of the coalesced droplets exiting electro-coalescer outlet 24 may occur, and an outlet section 704, for recovery of the separated phases. The vessel 701 may also include a gas outlet 706, an oil outlet 707 and a water outlet 708, arranged in the outlet section 704. In some instances, when the fluid stream to be separated does not include significant amounts of a gaseous phase, the gas outlet 706 is not required. The electro-coalescer assembly 10 may be similar to that as described above with respect to FIGS. 1-5.

As illustrated in each of FIGS. 1 and 6, the rod-shaped electrodes are arranged concentric in relation to the fluid pipes. However, when the fluid pipes are arranged substantially horizontal during use, it may be beneficial to have a little offset or some inclination of the rod-shaped electrode with respect to the centerline of the fluid pipe (the fluid pipe functions as a grounding cell). In this manner, it is possible to accommodate a free-water stream at the bottom of the electrode cell (i.e. the bottom of the fluid pipe of the electrode cell) without affecting the electro-coalescence performance. Such an offset or inclination may help to achieve higher coalescence performance and help prevent secondary droplet formation (re-emulsification). In various embodiments, the pipes may be substantially horizontal while the electrodes are inclined or declined, or the pipes may be inclined or declined while the electrodes are substantially horizontal. In yet other embodiments, each of the electrodes and pipes may be inclined or declined. Up-flow or down-flow embodiments are also envisaged.

In instances where the electrodes are inclined or declined, they may be disposed at an angle relative to the base plate 16 and the spacer(s) 32. In such instances, the through-holes 92 in base plate 16 and support holes 41 of spacer(s) 32 may also be at the desired angle of inclination or declination. In other words, while spacer 32 and base plate 16 may each be vertically disposed, the through-holes and other portions interacting with the electrode rods are formed at desired angles so as to result in proper disposal and support of the electrode rods.

The separator may also include a fluid/chemical injection system (not shown). Such a system may comprise an arrangement of spray nozzles, where each spray nozzle feeds an injection fluid/chemical at the inlet to each cell of the electrocoalescer. The injection fluid/chemical can have several functions, such as a chemical demulsifier, anti-fouling, fresh-water injection (e.g. for desalting applications), steam-injection for cleaning purposes, anti-corrosive fluid, etc.

The electrode assembly may use alternating current, high-voltage and high-frequency, to generate an intense electric field to polarize and rapidly coalesce dispersed water droplets in an oil-continuous phase. During operation, the strength of the electric field can be adjusted to reach an optimum value where water droplet-droplet coalescence is maximized while secondary droplet formation is prevented. The larger water droplets may separate much faster from the oil-continuous phase, such as in a main settling section 714 of an integral separator.

In use, a fluid flow to be separated will enter the inlet section 20 via the fluid inlet 18, and thence into the annular space between the pipes 22 and the electrodes 26, The liquid phase will partially separate into a high-density phase, such as water, and a low-density phase, such as oil. In extreme case of extra heavy oil, the density of the phases may be reversed. When passing through the pipes and electrodes of the electrode assembly, water droplets dispersed in the oil phase will coalesce and an improved phase separation is obtained in the separation zone of an integral gravity settler or a downstream settler.

As described above, embodiments disclosed herein provide an electro-coalescer system having an improved support and sealing system, enabling use of long rod-shaped electrodes. The ceramic tubes of the electrode may be a monolithic component, made of high purity ceramic, such as alumina. The ceramic tubes may be void- and bubble-free, and may have a thick-wall closed-end that greatly reduces electrical stress at the interface with a metallic electrode spacer.

Further, the sealing assembly includes a metal fitting that has a spherical shape and may be made of titanium, which has a similar coefficient of thermal expansion as the ceramic tube. This matching of the coefficients of thermal expansion may minimize thermal expansion difference between the ceramic rod and the sealing assembly. The spherical shape of the metal fitting or portions thereof, combined with the metal o-rings and the metal seats provides the process seal, and serves as articulation of the electrode at its interface to the base plate. The metal o-rings are soft and flexible, ensuring effective process seal despite surface irregularities or the use of a different material for the base plate. Together this gives the assembly the required flexibility to prevent leakage or structural damage of the electrode. The interface between the metal seat and the base plate contains features to prevent the rotation of the electrode assembly or the metal o-rings while tightening the closing nut. Should such rotation not be prevented, the likelihood of damaging the electrode assembly and/or the metal o-rings would be very high.

The inner wall of the ceramic tube may be copper plated. The copper layer may be thin enough to prevent mechanical damage of the ceramic tube, the plating itself, or detachment of the two components during service due to thermal variations, but may also be thick enough to keep the electrical resistance along the electrode sufficiently low.

The outside wall of a conductive wire-braided tubular-sleeve is in electric contact with the inner copper layer, while its inside wall is in electric contact with a thin-wall copper pipe all along the ceramic tube. This configuration provides the assembly with multiple advantages. For example, it prevents the presence of air in the electric field, as all air present in the electrode's interior is now at the same electrical potential. Further, it may diminish the electrical resistance throughout the electrode, maximizing the efficiency of the system. Additionally, it provides a flexible mechanical connection, both radially and axially, between the inner wall of the ceramic tube and the copper pipe. And also very importantly, the presence of the copper pipe may greatly strengthen the electrode assembly, allowing it to be attached to the equipment at only two points, namely at the base plate interface (articulated end) and at the electrode spacer interface (radially-fixed end).

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. An electro-coalescer system, comprising:
    a vessel having a fluid inlet and a fluid outlet, between which is a process chamber;
    a base plate separating an electric enclosure from the process chamber in the vessel;
    more than one pipes fluidly connecting the fluid inlet and the fluid outlet,
    more than one rod-shaped insulated electrodes, comprising a conductor disposed within a ceramic insulator; wherein:
        a first end of the more than one rod-shaped insulated electrodes is located within the electric enclosure,
        the more than one rod-shaped electrodes traverse respective through-holes of the base plate and through at least a portion of the more than one pipes, and
        a second portion of the more than one rod-shaped electrodes is supported by a spacer, the spacer being configured to support and maintain a position of the more than one insulated electrodes while simultaneously allowing fluid passage;
    a sealing assembly configured to form a seal between the through-holes and the rod shaped insulated electrodes, preventing fluid from traversing from the process chamber into the electric enclosure, the sealing assembly comprising:
        a metal fitting disposed around the rod-shaped insulated electrode;
        one or more metal o-rings;
        metal seats; and
        a closing nut;
        wherein the metal fitting has a coefficient of thermal expansion similar to the coefficient of thermal expansion of the ceramic insulator.

2. The electro-coalescer system as claimed in claim 1, wherein the metal fitting has a coefficient of thermal expansion within 1% of the coefficient of thermal expansion of the ceramic insulator.

3. The electro-coalescer system as claimed in claim 1, wherein the metal fitting has a coefficient of thermal expansion the same as the coefficient of thermal expansion of the ceramic insulator.

4. The electro-coalescer system as claimed in claim 1, wherein the interface between the metal seat and the base plate contains features to prevent the rotation of the electrode assembly and/or the metal o-rings while tightening the closing nut.

5. The electro-coalescer system as claimed in claim 1, wherein the rod-shaped insulated electrode comprises a monolithic ceramic tube that is void- and bubble-free, and wherein an inner wall of the monolithic ceramic tube is plated with a conductive metal, and wherein an outside wall of a conductive tubular sleeve is in electric contact with the conductive metal plating.

6. The electro-coalescer system as claimed in claim 1, wherein the rod-shaped insulated electrode comprises a monolithic ceramic tube having an open end and a closed end, and wherein the closed end extends a distance from an end of the tube.

7. The electro-coalescer system as claimed in claim 6, wherein the spacer is located along the distance of the closed end.

8. The electro-coalescer system as claimed in claim 1, wherein the ceramic insulator comprises alumina and wherein the metal fitting comprises titanium.

9. The electro-coalescer system as claimed in claim 1, wherein the spacer is metallic.

10. The electro-coalescer system as claimed in claim 1, wherein the metal o-rings, the metal seats, and the base plate are made of a material different than that of the metal fitting.

11. The electro-coalescer system as claimed in claim 1, wherein each through-hole of the base plate comprises:
- a threaded portion extending from the electrical enclosure side and terminating proximate a first shoulder intermediate the electrical enclosure side and the process chamber side of the base plate;
- a first longitudinal portion extending from the first shoulder to a second shoulder; and
- a second longitudinal portion extending from the second shoulder to the process chamber side of the base plate; and
- wherein a first metal seat is disposed proximate the first shoulder, a second metal seat is disposed proximate the second shoulder, and wherein the first and second metal seats each comprise a concave portion configured to mate with a convex portion of the metal fitting.

12. The electro-coalescer system as claimed in claim 11, wherein the first metal seat comprises a shoulder configured to interact with the first shoulder of the through-hole such that longitudinal movement of the first metal seat along the first longitudinal portion is limited.

13. The electro-coalescer system as claimed in claim 11, wherein the metal o-rings form a seal between the metal fitting, one of the metal seats, and the through-hole.

14. The electro-coalescer system as claimed in claim 1, wherein the base plate through holes are disposed at an angle from perpendicular, and wherein a support hole of the spacer is disposed at a similar angle from perpendicular.

* * * * *